(12) United States Patent
Rhodes et al.

(10) Patent No.: US 7,826,794 B2
(45) Date of Patent: Nov. 2, 2010

(54) DISTRIBUTED UNDERWATER ELECTROMAGNETIC COMMUNICATION SYSTEM

(75) Inventors: Mark Rhodes, West Lothian (GB); Brendan Hyland, Edinburgh (GB); Derek Wolfe, West Lothian (GB)

(73) Assignee: Wireless Fibre Systems, Livingston (GB)

( * ) Notice: Subject to any disclaimer, the term of this patent is extended or adjusted under 35 U.S.C. 154(b) by 1012 days.

(21) Appl. No.: 11/339,335

(22) Filed: Jan. 24, 2006

(65) Prior Publication Data

US 2007/0135044 A1      Jun. 14, 2007

(30) Foreign Application Priority Data

Dec. 14, 2005  (GB) ................. 0525428.9

(51) Int. Cl.
 *H04B 13/02* (2006.01)
(52) U.S. Cl. ................. 455/40; 455/41.1; 455/41.2; 455/80; 455/99; 455/345; 455/500; 367/131; 367/134; 340/850; 340/870.11; 343/701; 343/719
(58) Field of Classification Search .............. 455/40, 455/41.1, 41.2, 500, 80, 99, 345; 367/131, 367/134; 343/719, 701; 340/850, 870.11
See application file for complete search history.

(56) References Cited

U.S. PATENT DOCUMENTS

| | | | |
|---|---|---|---|
| 3,867,710 A * | 2/1975 | Busignies | 340/850 |
| 3,935,649 A | 2/1976 | Harte | |
| 4,258,477 A | 3/1981 | Ishiyama | |
| 4,458,248 A | 7/1984 | Lyasko | 343/719 |
| 4,496,058 A | 1/1985 | Harris et al. | |
| 4,992,786 A | 2/1991 | Kirkland | 340/850 |
| 5,315,561 A * | 5/1994 | Grossi | 367/1 |
| 5,422,860 A * | 6/1995 | Bradley et al. | 367/89 |
| 5,579,285 A * | 11/1996 | Hubert | 367/133 |
| 5,598,152 A * | 1/1997 | Scarzello et al. | 340/850 |
| 5,701,276 A * | 12/1997 | Bellini | 367/133 |
| 5,886,661 A * | 3/1999 | Harrison et al. | 342/22 |
| 5,938,242 A | 8/1999 | Ryan | |
| 6,058,071 A * | 5/2000 | Woodall et al. | 367/3 |
| 6,125,080 A * | 9/2000 | Sonnenschein et al. | 367/134 |
| 6,130,859 A * | 10/2000 | Sonnenschein et al. | 367/134 |
| 6,169,876 B1 | 1/2001 | Larson et al. | |
| 6,556,297 B1 * | 4/2003 | Cappiello | 356/328 |
| 6,652,286 B1 | 11/2003 | Larsen | |
| 6,938,768 B2 | 9/2005 | Ferretti et al. | |
| 6,999,857 B1 * | 2/2006 | Kasper et al. | 701/1 |
| 7,190,634 B2 * | 3/2007 | Lambert et al. | 367/128 |
| 2005/0088916 A1 * | 4/2005 | Zhu et al. | 367/134 |
| 2006/0256652 A1 * | 11/2006 | Thomas | 367/15 |
| 2007/0297290 A1 * | 12/2007 | Vosburgh et al. | 367/131 |

FOREIGN PATENT DOCUMENTS

WO      WO 01/95529      12/2001

* cited by examiner

*Primary Examiner*—Marceau Milord
(74) *Attorney, Agent, or Firm*—Paul Davis; Goodwin Procter LLP

(57) ABSTRACT

An extended underwater electromagnetic transducer is provided with an electrically insulated transmission line typically connected to a transmitter or receiver or transceiver system. The transmission line allows near-field communications with another transmitter or receiver or transceiver system. The transmission line provided is relatively long, the through water signal path length can be significantly reduced.

8 Claims, 4 Drawing Sheets

DISTRIBUTED UNDERWATER ELECTROMAGNETIC COMMUNICATION SYSTEM

CROSS REFERENCE TO RELATED APPLICATIONS:

This application claims the benefit of United Kingdom application ser. no. GB 0525428.9 filed Dec. 14, 2005, which application is fully incorporated herein by reference.

INTRODUCTION

The present invention relates to an underwater electromagnetic transducer system for use in communications, navigation or other systems.

BACKGROUND

Various underwater systems that allow communication whilst avoiding any physical contact are known. One of the most common is based on sonar techniques. A problem with such systems is that they cannot support high bandwidth information transfer. Such systems are also degraded by noise and interference from a number of sources. Other underwater communication systems use radio links, i.e. extreme low frequency electromagnetic signals, usually for long-range communications between a surface station and a submerged vessel. These systems typically operate in the far field using physically large electric field coupled antennas and support data rates of only a few bits per second.

To overcome some of the problems associated with radar and sonar, electromagnetic transmission has been proposed for underwater communications. This offers high bandwidth communication, but over relatively short ranges. WO01/95529 describes an underwater communications system that uses electromagnetic signal transmission. This has a transmitter and a receiver, each having a metallic aerial that is surrounded by a waterproof electrically insulating material. GB0511939.1 and U.S. 60/690,966 describe underwater communications systems that use magnetically coupled electrically insulated antennas.

EM transmission systems are immune to acoustic noise and do not suffer from multipath effects due to the rapid attenuation of the EM signals. However, the short range can be restrictive where one or more of the communicating systems are mobile.

SUMMARY OF INVENTION

According to one aspect of the present invention, there is provided an extended underwater electromagnetic transducer comprising an electrically insulated transmission line of significant length typically connected to a transmitter or receiver or transceiver system, the transmission line being such as to allow near-field communications with another transmitter or receiver or transceiver system.

Because water is a conductive media, electromagnetic signals experience relatively high attenuation when passing through it. Seawater is much more conductive than fresh water and hence exhibits a higher loss. In accordance with the present invention, by providing a relatively long transmission line, the through water signal path length can be significantly reduced. This is because signals can be captured in the near field, and so over a relatively short distance, and subsequently transmitted along the length of the transmission line. This is highly beneficial.

Preferably, the transducer allows communications between stations using electromagnetic coupling. To do this, two transducers are brought to within a suitable distance at some point along their length thus allowing communication to take place using electromagnetic coupling. The transducer performs two functions, acting firstly as the mechanism for coupling of the energy and secondly to act as a transmission line to conduct the electrical energy between the region of coupling and the communicating station.

DETAILED DESCRIPTION

The present invention relates to a transducer system optimised for the transmission and reception of electromagnetic signals underwater offering increased flexibility in the relative positioning of the systems. One or more of the systems that wish to communicate deploy an extended conducting transmission line, which also forms the electromagnetic transducer. This transmission line must be electrically insulated from the surrounding water. This type of transducer is needed because water is an electrically conducting medium. These transducers are of significant lengths, and act as radiators of the electromagnetic energy in transmission or as receptors when used to receive signals. These transducers allow for the conversion between electrical energy within the conductor and electromagnetic energy in the water. While these transducers may be of any length selected as appropriate for the application and carrier frequency, they would typically be greater than 1 meter in length. To gain maximum benefit, the length should be more than the maximum distance over which underwater electromagnetic coupling can occur, ideally at least double that distance. As will be appreciated, this length will vary depending, for example, on the transmission frequency and the composition of the water. A block diagram of a suitable system is shown in FIG. 1.

Figure 1:
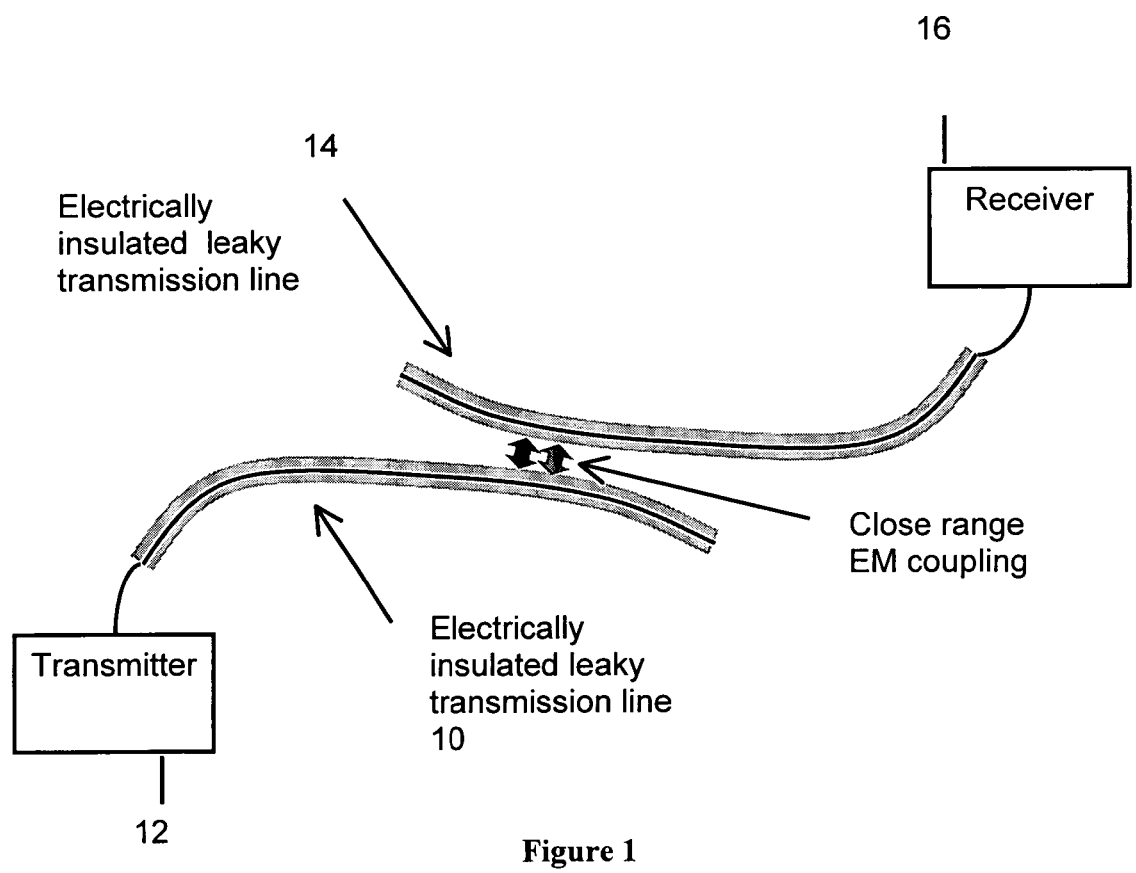
FIG. 1 shows an underwater communications system employing extended transducers.

FIG. 1 shows a first underwater electrically insulated leaky transmission line 10 that is connected to a transmitter 12 that is operable to transmit electromagnetic signals and a second underwater electrically insulated leaky transmission line 14 that is connected to a receiver 16 that is operable to receive electromagnetic signals. When any part of the first long transducer 10 moves into close proximity of any part the second communicating transducer 14, short-range electromagnetic coupling is possible. Hence, despite the fact that the transmitter 12 and receiver 16 may themselves be positioned out of the normal EM transmission range, by providing the first and second transmission lines 10 and 14, communication is possible over a significantly wider range of relative positions. Where alignment of the axes of the transducers 10 and 14 within the coupling region can be achieved, transmission will be improved.

The transmission line transducers 10 and 14 of FIG. 1 serve two functions. Firstly, they provide short-range electromagnetic signal coupling, which can take place anywhere along the length of the transducer. Secondly, the transducer acts to guide the RF signal along its length to or from the transmitter/receiver. In this way, remote coupling of the signal can be achieved, whilst at the same time allowing relative movement between the transmitter and receiver. Reduction of the through water signal path length is particularly beneficial for high bandwidth communications, where a high carrier frequency must be used. This is because attenuation of the electromagnetic in water rises rapidly with increasing frequency. Hence, by limiting the distance that the signal has to travel through the water, attenuation can be kept to a minimum.

The system of FIG. 1 provides further advantages, for example it allows flexibility in the relative positioning of the communicating systems. This is useful when higher bandwidths have to be communicated underwater. For example, should an underwater vehicle wish to communicate with a device located on the sea bed, it is advantageous for the vehicle to only require approximate positioning before communication can take place. The present invention is such that only part of each transducer need be in close proximity to the other thus offering flexibility in positioning. For example, to allow and autonomous underwater vehicle to download data at 1 Mbps, a carrier frequency of 10 MHz may have to be employed. In this example case, the tolerable through water path may be only 1-2 m due to the limits of sensitivity of the receiving equipment. By employing extended transducers, the vehicle need only be manoeuvred such that a small part of the extended transducers are within this range, the transducers themselves being perhaps 3-5 m in length.

The elongate leaky transducer 10, 14 may take a number of forms. For low frequency operation the distributed transducer could be implemented simply as a single core, electrically insulated wire. This may be appropriate for frequencies below 1 MHz. As the frequency of the carrier increases, the wavelength decreases until the length that would be needed for the distributed transducer in practice would be several wavelengths long. At this point, rather than just using a transmission line, a waveguide cable, for example a co-axial cable, will be required to efficiently transport the signal from the coupling point to the transceiver. In this case, it will be necessary to modify the coaxial shielding to allow coupling of the EM signal. In one implementation helical slots may be cut in the shielding to allow coupling of signals into a co-axial cable for transport to the transceiver. The co-axial cable will be electrically insulated from the water and terminated in its characteristic impedance to prevent reflections. Another implementation may employ an electrically insulated twisted pair of wires, which are imbalanced to allow coupling of some energy into the surrounding water. This imbalance can be achieved by making the wires unequal in length or by terminating with mismatched load impedance for example. Further implementations are clearly possible where the transducer acts as both a conveyance for the electrical signal energy and allows coupling of a proportion of the electromagnetic signal energy with the surrounding environment. The actual implementation chosen would be selected based on the frequency of operation, the required length of the transducer and the distance that could be tolerated between the transducers. It should be noted that traditional transmission lines attempt to minimise any coupling to the surroundings.

Figure 2:
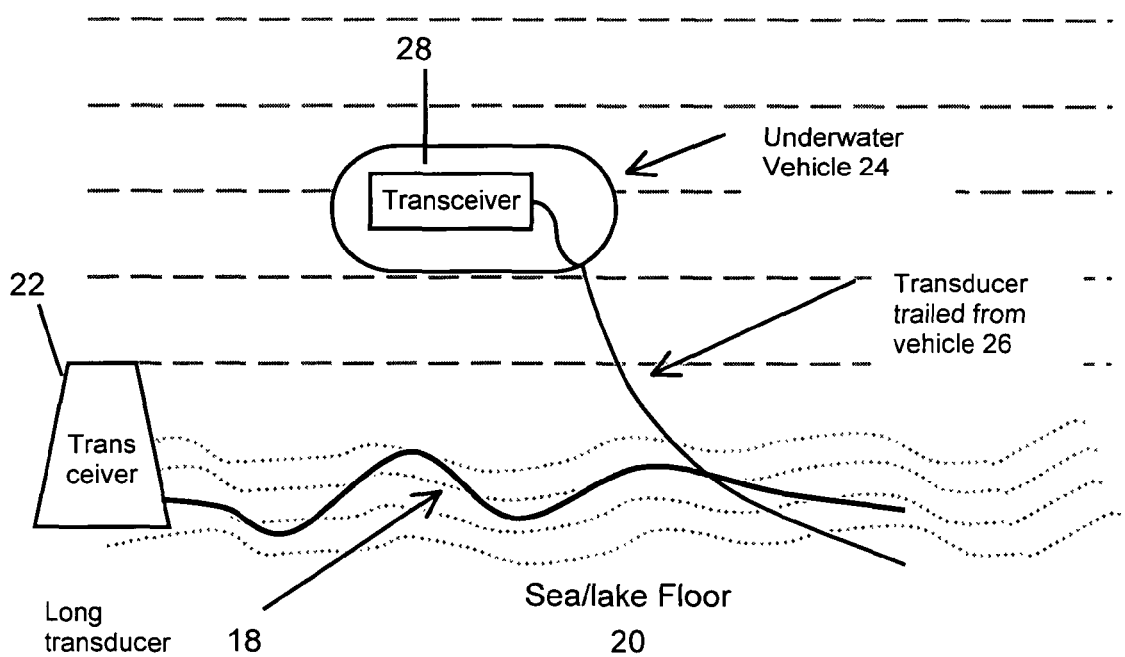
FIG. 2 is an example of the deployment of the system of FIG. 1 on the seabed.

FIG. 2 shows a variation on the arrangement of FIG. 1. In this, a coaxial transmission line 18 is laid across the seabed 20 and is connected to a seabed mounted transceiver unit 22. As before, the long wire conductor must be electrically insulated from the surrounding water. An underwater vehicle 24 that wishes to communicate with the transceiver unit 22 deploys another similarly coaxial transmission line 26, connected to a transceiver 28 within the vehicle 24. In use, the underwater vehicle 24 manoeuvres such that the vehicle's transducer cable 26 is close to the transducer cable 18 of the seabed system. Once sufficiently close the two units may then communicate through the electromagnetic coupling between the two transducers 18 and 26. One or more of the transducers may be selectively extendible, only being spread out underwater when required for communications.

Figure 3:
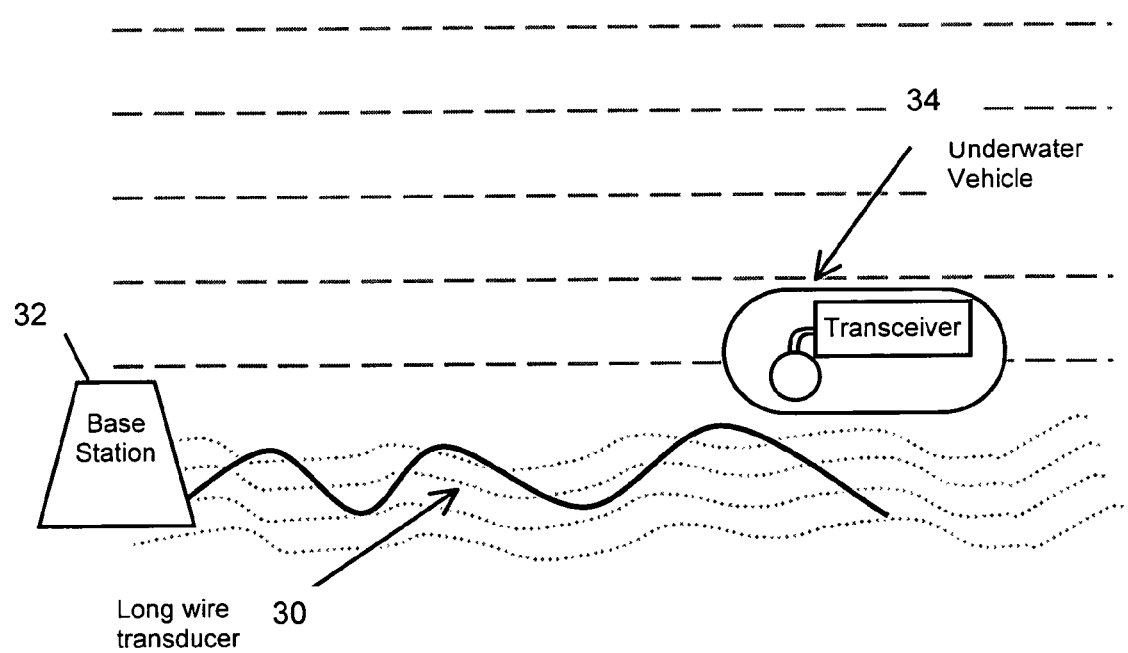
FIG. 3 is an example of an alternative deployment of the system of FIG. 1 employing only one extended transducer.

FIG. 3 shows another configuration. In this, an extended transducer 30 is again laid across the seabed and connected to a seabed transceiver unit 32, thereby to allow communication with an underwater vehicle 34. However, in this case, the underwater vehicle 34 employs an insulated magnetically coupled loop as the transducer. This is less flexible than the arrangement of FIGS. 1 and 2 as more accurate positioning is required. However, this arrangement avoids the need for the underwater vehicle to trail a long conductor, which may lead to difficulties operating around other underwater equipment.

Figure 4:
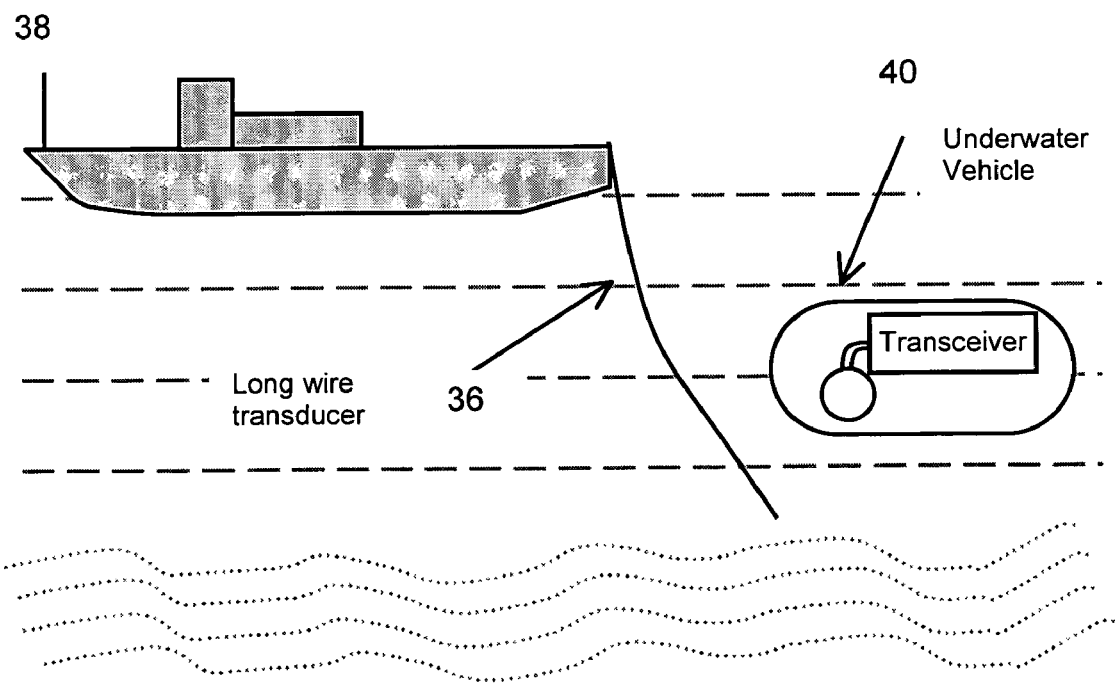
FIG. 4 is an example of a deployment of the system of FIG. 1 that allows communication between a surface vessel and a submerged station.

FIG. 4 shows yet another possible arrangement. Here, an extended, elongate transducer 36 is trailed vertically or at an angle behind a water surface vessel 38. This is provided to allow communication with an underwater station 40. The underwater station 40 may be a fixed station or an underwater vehicle and may or may not use an extended underwater transducer, a magnetic coupling loop or some other form of EM transducer. In this case, either of the surface vessel 38 or the underwater station 40 manoeuvres until parts of the transducers are close enough for electromagnetic coupling to take place. This arrangement may be appropriate for gathering data from logging systems installed underwater where a surface vessel can retrieve data rapidly by positioning the extended transducer close to that logging system.

The extended transducer systems in which the invention is embodied may be used for underwater communications. They may also be employed as part of a navigation system. For navigation, the systems would be typically deployed in one of the configurations above. However, the information transmitted and received would include elements and waveforms specifically for navigational purposes. This might include the known position of the base-station, timing signals and may be synchronised to other base stations. Here the extended nature of the transducer allows the system requiring the navigational information an extended range over which to navigate accurately.

A skilled person will appreciate that variations of the disclosed arrangements are possible without departing from the invention. For example, although the specific implementations of FIGS. 2, 3 and 4 are described separately, it will be appreciated that there are many alternative configurations where one or more extended transducers may be deployed. Accordingly the above description of the specific embodiment is made by way of example only and not for the purposes of limitation. It will be clear to the skilled person that minor modifications may be made without significant changes to the operation described.

The invention claimed is:

1. An underwater communication system comprising:
a first transmitter and/or first receiver for transmitting and/or receiving electrical signals;
a first elongate transducer electrically insulated from the water and coupled to said first transmitter and/or first receiver;
a second transmitter and/or second receiver for transmitting and/or receiving electrical signals; and
a second elongate transducer electrically insulated from the water and coupled to said second transmitter and/or second receiver;

wherein said first elongate transducer is operable to provide both near-field electromagnetic coupling of said electrical signals to said second elongate transducer and conveyance of said electrical signals along its path from said first transmitter and/or to said second receiver and said first and second elongate transducers have a length that is more than the maximum distance over which said underwater electromagnetic coupling occurs.

2. An underwater communication system as claimed in claim 1, wherein said first and/or second elongate transducers are a coaxial cable that is adapted to couple said near-field electrical signals to and/or from said underwater environment.

3. An underwater communication system as claimed in claim 1, wherein said first and/or second elongate transducers are an electrically insulated conductor cable that is adapted to couple said near-field electrical signals to and from said underwater environment.

4. An underwater communication system as claimed in claim 1, wherein said first and/or second elongate transducers are an electrically insulated imbalanced twisted pair cable that is adapted to couple said near-field electrical signals to and from said underwater environment.

5. An underwater communication system as claimed in claim 1, wherein said first and/or second elongate transducer and its associated transmitter and/or receiver are provided in a mobile station.

6. An underwater communication system as claimed in claim 1, wherein said first and/or second elongate transducer and its associated transmitter and/or receiver are provided in a station that is located at a fixed position.

7. An underwater communication system as claimed in claim 6 wherein said first and/or second elongate transducer is carried on a sub-water surface.

8. An underwater communication system as claimed in claim 1, wherein said first and/or second elongate transducer is selectively extendible into an operational position as and when required.

* * * * *